April 1, 1952     B. C. CALDWELL     2,591,051
TRIPOD
Filed March 22, 1949     2 SHEETS—SHEET 1
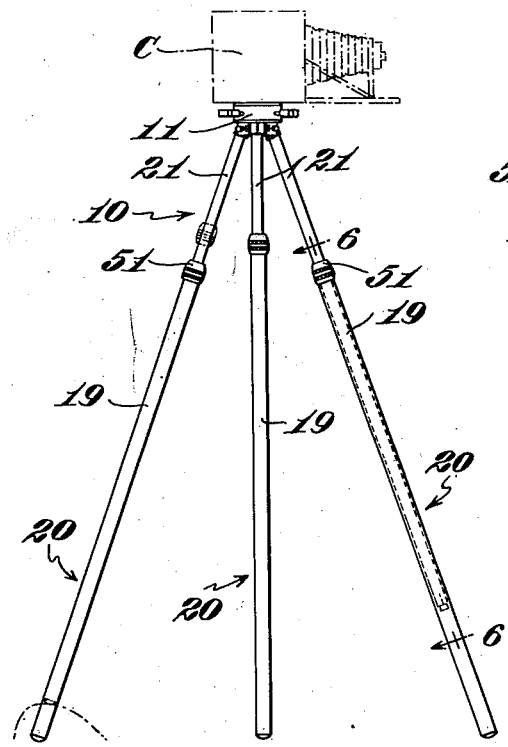
Inventor
Byrt C. Caldwell
by Roberts, Cushman & Grover
Att'ys April 1, 1952 B. C. CALDWELL 2,591,051
TRIPOD
Filed March 22, 1949 2 SHEETS—SHEET 2
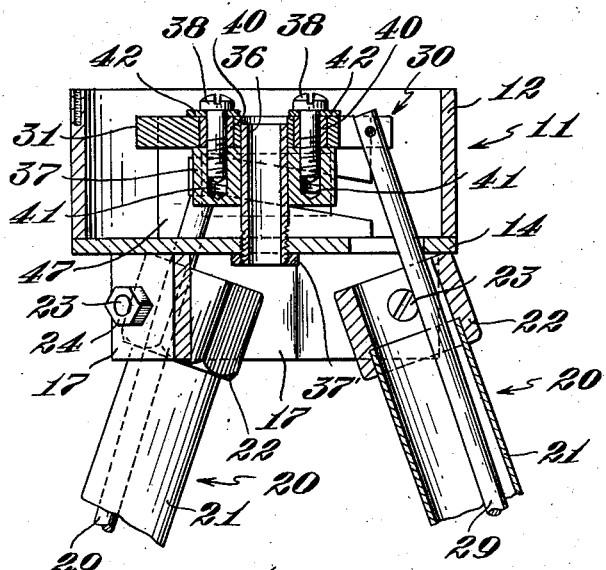
Fig. 4
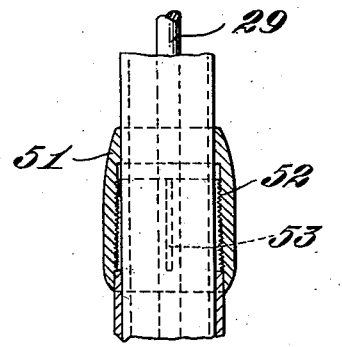
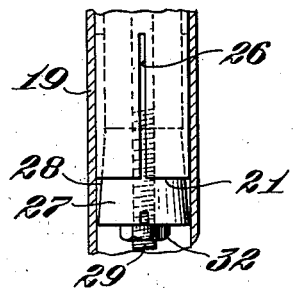
Fig. 6
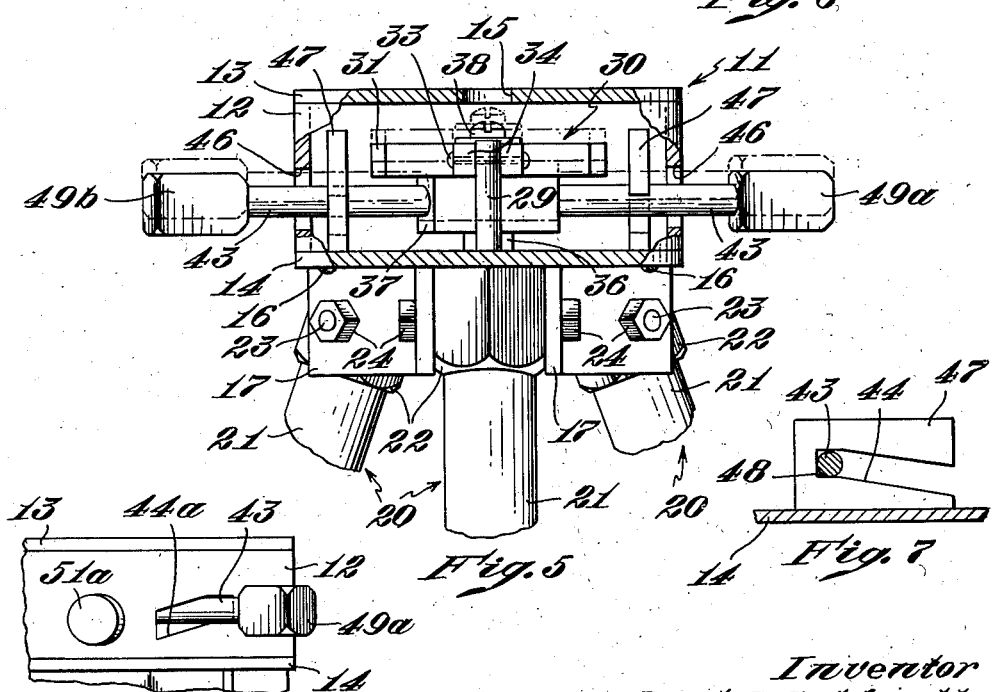
Fig. 5
Fig. 7
Fig. 8
Inventor
Byrt C. Caldwell
by Roberts, Cushman & Grover
Att'ys Patented Apr. 1, 1952

2,591,051

UNITED STATES PATENT OFFICE 2,591,051

TRIPOD

Byrt C. Caldwell, Scituate, Mass., assignor, by mesne assignments, to Harold K. Chisholm, Wellesley, Mass.

Application March 22, 1949, Serial No. 82,870

4 Claims. (Cl. 248—188)

This invention relates to tripods for supporting photographic or surveying instruments and more particularly to the type of tripod having adjustable legs which are adaptable to uneven terrain.

Objects of this invention are to provide a tripod which will support a photographic or surveying instrument, which has legs automatically adjustable to uneven terrain, which is simple and reliable to operate, which is rugged and trouble-free, which is attractive in appearance, and which improves the art generally.

In a broad aspect the invention contemplates a tripod comprising a head adapted to hold a photographic or surveying instrument, supported by three legs which are pivotally attached thereto. At least one of the legs includes an inner and outer member, one of which telescopes within the other. Wedge means is provided for expanding the telescoping end of one member against the corresponding surface of the other member whereby the leg is locked in an adjusted position accommodating the supporting terrain or other surface.

In a more specific aspect of the invention the tripod comprises a head adjusted to hold an instrument such as a camera or a transit and supported by three extendible legs each of which has an inner sleeve with one end pivotally attached to the head. The opposite end of each sleeve is slotted and telescopes within an outer sleeve. A cam assembly located in the head includes a rotatable member pivotally connected to the hand and having two oppositely disposed operating arms projecting therefrom. Each of the arms is engaged by a cam surface whereby the rotatable member is raised as the arms are moved by the operator. A clevis piece carried by the rotatable member and three rods extending therefrom are also raised by the movement of the arms so that arbors attached to the bottom of the respective rods are forced into the correlated slotted sleeve ends thereby expanding the ends against the inner surfaces of the outer sleeves whereby the lengths of the legs are adjustable to accommodate the supporting terrain.

These and other objects and aspects of the invention will be apparent from the following description of an illustrative specific embodiment of the invention referring to drawings in which Fig. 1 is a side elevation view of one embodiment of the invention;

Fig. 2 is an enlarged fragmentary view showing the manner of connecting the legs to the head;

Fig. 3 is a plan view of the head with the cover removed to show the cam assembly;

Fig. 4 is a sectional view on line 4—4 of Fig. 3;

Fig. 5 is an elevation view of the head with the casing broken away;

Fig. 6 is a sectional view on line 6—6 of Fig. 1;

Fig. 7 is a fragmentary view of the cam piece; and

Fig. 8 is a fragmentary view of a second embodiment of the invention.

In the particular embodiment of the invention chosen for the purpose of illustration, the tripod 10 (Fig. 1) comprises a head 11 having a cylindrical wall 12 and top and bottom pieces 13 and 14 which are secured to the wall by means of the screws 16 (Fig. 5). The top piece 13 is provided with a socket such as the aperture 15 or other suitable fastening device (not shown) for securing the camera C or other instrument such as a transit to the head 11. Three equally spaced angle pieces 17 are fastened to the bottom pieces 14 by the screws 18 (Fig. 3), two of which extend through the bottom piece 14 into each edge of the respective angle pieces.

Between the adjacent flanges of the angle pieces 17 are pivotally connected the three tripod legs 20. Each leg 20 includes an outer extendible member such as the sleeve 19 (Fig. 6) into which telescopes the lower end of the inner member or sleeve 21. The upper end of the inner sleeve 21 is sweated or otherwise fastened into an aperture in a hexagonal fitting 22 (Fig. 4). The fitting 22 is proportioned so that the opposite sides thereof are contiguous the flanges of two adjacent angle pieces 17, the pivotal connection between the side and the flange being completed in each instance by a bolt 23. As is shown in Fig. 4, the head of each bolt 23 is located within the aperture of the correlated fitting 22 so that the body thereof extends through aligned apertures in the fitting side and the flange of the angle piece 17. The body of each bolt 23 projects beyond the correlated flange to engage a respective nut 24.

The lower end of each inner sleeve 21 is slotted as at 26 (Fig. 6) thus permitting it to be expanded by a tapered arbor 27 as will be described in detail below, the expanded end of the sleeve 21 bearing against the inner surface of the outer sleeve 19 thereby locking the sleeves with respect to each other. Each arbor 27 is disposed within the end of the correlated inner sleeve 21 with its tapered surface 28 abutting the inner surface of the sleeve when the arbors 27 are forced into the ends of the respective sleeves 21 by the rods 29 which extend upwardly through the respective sleeves to the head 11 to pivotally connect with a triangular clevis piece 31 of a cam assembly 30 (Fig. 4).

The lower end of each rod 29 is threaded into an axially positioned aperture in its respective arbor 27 being secured thereto by a check nut 32. The opposite end of each rod is secured by a pin 33 (Fig. 3) held in a clevis formed by two arms 34 which project from each of the respective sides of the triangular piece 31. The triangular piece 31 is centrically located with respect to the head 11 by means of the upper end of a hollow pin 36, a sliding fit being provided so that the piece can be moved axially with respect to the pin as described below. The lower end of the pin 36 has an external thread which engages a threaded aperture located at the center of the bottom piece 14 of the head 11. A check nut 37 (Fig. 4) is used to prevent the disengagement of the threads of the pin 36.

Rotatably engaging the pin 36 is an octagon shaped member 37' which is positioned immediately below the triangular clevis piece 31. Relative axial movement between the rotatable member 37 and the clevis piece 31 is prevented by the two screws 38. Each of the screws 38 extends through a slotted aperture 39 (Fig. 3) in the clevis piece 31 to engage a threaded aperture 41 (Fig. 4) in the rotatable member 37 thereby permitting the member to rotate about the pin 36 relatively to the clevis piece 31 which is prevented from rotating by the arbor operating rods 29. Washers 42 and bushings 40 are inserted between the heads of the screws 38 and the clevis piece 31.

The rotatable member 37 is moved by two arms 43 which extend outwardly from the opposite sides thereof through slots 44 and 46 in the cam plates 47 and the wall 12 respectively. As is best shown in Fig. 7, the cam slot 44 in each cam plate 47 is acclivous so that the counterclockwise rotation of the arms 43 causes the arms to rise thereby moving the rotatable member 37 and the clevis piece 31 upwardly upon the pin 36. The movement of the arms 43 also rotates the member 37 about the pin 36, the slots 39 permitting relative movement with respect to the clevis piece as has been described heretofore. The above elevating of the clevis piece 31 conjointly raises the rods 29 so that the arbors 27 expand the ends of the respective inner sleeves 21 thus locking the inner and outer sleeves of the legs 18. A horizontal portion 48 is provided as a lock at the upper end of each cam slot 44 so that the arms 43 do not slip from the locked position when released by the operator. For the further convenience of the operator knobs 49a and 49b are provided at the ends of the arms 43. Used in conjunction with the arm knobs 49a and 49b are the stationary knobs 51a and 51b which are fastened directly to the wall 12 of the head 11.

The tripod 10 is set up by pivoting the legs 18 outwardly at a suitable angle and holding the head 11 and attached camera C at the desired angle and elevation above the terrain or other supporting surface by means of one hand. The forefinger and thumb of the other hand are used to grasp the knobs 49a and 51a whereby the cam assembly 30 is rotated in a clockwise direction to release the arbors 27. With the ends of the inner sleeve 21 no longer expanded against the outer sleeves 19, the outer sleeves drop under the force of gravity until the bottom ends thereof contact the terrain, each sleeve automatically adjusting itself to the proper length to support the tripod in the desired position. The knobs 49b and 51b are then used to rotate the cam assembly 30 in the counterclockwise direction thus causing arbors 27 to lock the inner and outer sleeves of the legs 18 as described in detail heretofore.

The inner and outer sleeves of each leg 18 may also be individually locked in any desired position by means of a respective knurled ferrule 51 (Fig. 6) having a tapered internal thread 52 for engaging a similar thread upon the upper end of the outer member 19. The end is slotted as at 53 so that the tightening of the ferrule 51 compresses the end of the outer tube 19 against the outer surface of the inner tube 21 thereby to lock the sleeves with respect to each other.

Another embodiment of the head and cam assembly is shown in Fig. 8, wherein the cam plates 47 are eliminated and the cam slots 44a are cut directly in the wall 12 of the head 11. The construction and operation of the other elements of this embodiment is the same as corresponding elements described in detail in connection with the first embodiment.

It should be understood that the present disclosure is for the purpose of illustration only and that this invention includes all modifications and equivalents which fall within the scope of the appended claims.

I claim:

1. A tripod for supporting an instrument comprising a head adapted to hold said instrument, three circumferentially spaced legs pivotally attached to said head, at least one of said legs having an inner member and an outer member in telescopic relation with said inner member, wedge means located in said inner member for expanding the inner member against the contiguous surface of the outer member, and cam means located in the head for moving the wedge means thereby frictionally to lock the legs in selected positions of adjustment accommodating the supporting terrain.

2. A tripod for supporting an instrument comprising a head adapted to hold said instrument, three extendible legs each having an inner sleeve with one end pivotally attached to said head, the opposite end thereof being slotted, and an outer sleeve telescoping with the slotted end of said inner sleeve, a movable arbor having a tapered portion projecting into the slotted end of each of the respective inner sleeves whereby the slotted end can be expanded to lock the outer sleeve, and manually operable cam means located in said head and connecting with the arbors for moving the arbors into the respective slotted sleeve ends thereby frictionally to lock the legs in selected positions of adjustment accommodating the supporting terrain.

3. A tripod for supporting an instrument comprising a head adapted to hold said instrument, three extendible legs each having an inner sleeve with one end pivotally attached to said head, the opposite end thereof being slotted, and an outer sleeve telescoping with the slotted end of said inner sleeve, a movable arbor having a tapered portion projecting into the slotted end of each of the respective inner sleeves whereby the slotted end can be expanded to lock the outer sleeve, a manually operable cam assembly located in said head, a rod extending from said assembly to each of the respective arbors which rods are raised by the operation of the cam assembly to move the arbors into the respective slotted ends thereby frictionally to lock the legs in selected positions of adjustment accommodating the supporting terrain.

4. A tripod for supporting an instrument comprising a head adapted to hold said instrument; three extendible legs each having an inner sleeve with one end pivotally attached to said head, the opposite end thereof being slotted, and an outer sleeve telescoping with the slotted end of said inner sleeve; a movable arbor having a tapered portion projecting into the slotted end of each of the respective inner sleeves whereby the slotted end can be expanded to lock the outer sleeve; a cam assembly including a rotatable member pivotally connected to said head, two oppositely disposed operating arms for manually rotating said member, a cam engaging each of said arms whereby said rotatable member is raised as the arms are moved, a clevis piece carried by said rotatable member and conjointly raised therewith; and a rod extending from said clevis piece to each of the respective arbors for moving the arbors into the slotted ends as the cam is raised thereby frictionally to lock the legs in selected positions of adjustment accommodating the supporting terrain.

BYRT C. CALDWELL.

REFERENCES CITED

The following references are of record in the file of this patent:

UNITED STATES PATENTS

| Number | Name | Date |
|---|---|---|
| 2,490,369 | Neuwirth | Dec. 6, 1949 |